(12) United States Patent
Hines

(10) Patent No.: US 6,859,893 B2
(45) Date of Patent: Feb. 22, 2005

(54) SERVICE GURU SYSTEM AND METHOD FOR AUTOMATED PROACTIVE AND REACTIVE COMPUTER SYSTEM ANALYSIS

(75) Inventor: George Hines, Menlo Park, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 645 days.

(21) Appl. No.: 09/920,531

(22) Filed: Aug. 1, 2001

(65) Prior Publication Data

US 2003/0028825 A1 Feb. 6, 2003

(51) Int. Cl.[7] .............................................. G06F 11/00
(52) U.S. Cl. ........................................ 714/38; 714/46
(58) Field of Search ............................ 714/26, 27, 37, 714/38, 45, 46

(56) References Cited

U.S. PATENT DOCUMENTS

| | | | |
|---|---|---|---|
| 5,111,384 A | * 5/1992 | Aslanian et al. ............... | 714/26 |
| 5,179,695 A | 1/1993 | Derr et al. ................... | 395/575 |
| 5,287,505 A | 2/1994 | Calvert et al. ............... | 395/600 |
| 5,335,341 A | * 8/1994 | Chana ......................... | 714/37 |
| 5,678,002 A | 10/1997 | Fawcett et al. ........ | 395/183.01 |
| 5,897,630 A | 4/1999 | Schneider Huddleston Virta et al. ............................................................... | 706/45 |
| 6,029,258 A | 2/2000 | Ahmad ........................ | 714/46 |
| 6,633,876 B1 | * 10/2003 | Heatlie ....................... | 707/10 |
| 6,681,348 B1 | * 1/2004 | Vachon ........................ | 714/45 |
| 6,738,928 B1 | * 5/2004 | Brown ......................... | 714/26 |
| 6,738,932 B1 | * 5/2004 | Price .......................... | 714/38 |
| 2002/0078404 A1 | * 6/2002 | Vachon et al. ................ | 714/38 |
| 2002/0095615 A1 | * 7/2002 | Hastings et al. ............... | 714/4 |
| 2003/0028857 A1 | * 2/2003 | Zagorski et al. ............ | 717/124 |

* cited by examiner

*Primary Examiner*—Scott Baderman
(74) *Attorney, Agent, or Firm*—Kent A. Lembke; William J. Kubida; Hogan & Hartson LLP

(57) ABSTRACT

A computer method for automatically troubleshooting and preventing problems on a computer system. The method includes receiving data corresponding to the computer system including core files, supplemental configuration information, and other data. The method continues with processing the computer system data into a format useful for rapid analysis. The method uses a knowledge repository of phases and scripts. Each phase is a logical organization of scripts. Each script is an executable for identifying both the conditions that can lead to a problem as well as determining an actual instance of a problem. Execution of the method includes execution of the phases contained in the repository. Several optimizations are used to eliminate large quantities of scripts in order to improve run time. Phases produce intermediate results that can be used by subsequent phases to reduce complexity. A report is generated listing problems for the computer system with corrective actions.

19 Claims, 10 Drawing Sheets

| VARIABLE NAME/ARRAY | VARIABLE VALUE/ARRAY INDEX | ARRAY VALUE |
|---|---|---|
| OS | 5.6 | N/A |
| ISA | SUN4U | N/A |
| PATCHLIST | 104572 | 03 |
| PATCHLIST | 104631 | 05 |
| PATCHLIST | 104668 | 04 |
| VFSTAB | LETC/VFSTAB | N/A |
| ⋮ | ⋮ | ⋮ |
| | | |

SERVICE GURU SYSTEM AND METHOD FOR AUTOMATED PROACTIVE AND REACTIVE COMPUTER SYSTEM ANALYSIS

BACKGROUND OF THE INVENTION

1. Field of the Invention

The present invention relates, in general, to systems and methods for identifying and resolving problems in computer system software and hardware, and more particularly, to an automated service tool or guru device and method for processing kernel and user core files and other data sources proactively and reactively to identify possible computer system problems or bugs and identify remedial actions to address the identified problem.

2. Relevant Background

Computer system designers and analysts face the ongoing and often difficult task of determining how to fix or improve operation of a computer system that has experienced an unexpected exception or is failing to operate as designed (e.g., is experiencing errors caused by software problems or "bugs"). When a problem or bug in the computer system software is serious enough to stop or interrupt the execution of a running program, this failure is known as a crash. To assist in identifying bugs in the software operating on a computer system, software applications are often configured to create a crash dump or memory dump when an unexpected exception occurs to generate a memory image of the existing state of software executing on the system at the time of the crash or exception. These memory images are sometimes called core files (or dump files).

The system-level commands or programs in the operating system, i.e., the kernel software, are of particular interest to system analysts in correcting bugs in a crashed computer system. For example, in an UNIX®-based system, the kernel is the program that contains the device drivers, the memory management routines, the scheduler, and system calls. Often, fixing bugs begins with analysis of these executables, which have their state stored in a kernel core file. Similarly, user programs or binaries (e.g., binary, machine readable forms of programs that have been compiled or assembled) can have their state stored in user core files for later use in identifying the bugs causing the user applications to crash or run ineffectively.

Instead of writing a new, complete replacement version of the software (that crashed or had bugs), the designer or developer often prepares one or more small additions or fixes to the original software code (i.e., patches) written to correct specific bugs. For example, when a specific bug is identified, a patch is written or obtained from a third party to correct the specific problem and the patch is installed on the computer system. A single patch often contains fixes for many bugs for convenience. However, a particular bug is usually, but not always, fixed by a single patch (i.e., multiple patches usually do not address the same bugs). Typically, system analysts or operators keep or acquire records of previously identified bugs and corresponding patches installed for each identified bug. Then, when a bug is encountered in a system, the system analyst efforts to fix the problem begin with a search of these records of prior bugs to identify the bug or find a similar, previously-identified bug. Once the bug is identified, a relevant patch is selected that may correct the problem or a new patch may be written similar to or based on the previous patch. Additionally, the analyst may determine if a newer version of the patch is now available.

For example, a bug may be identified that causes an exception, such as causing the computer system to fall into panic when two specific programs are run concurrently. A record of the bug would then be created and stored in a database including a bug identifier (e.g., alpha-numeric identification code) along with descriptive information such as a synopsis describing the problem (for the above example, "system falls into panic while shutdown procedure is executed during writing") and information describing the results or symptoms of the bug (e.g., a crash, hang, stack trace, type of panic, and the like). Once a fix for the bug is available, a patch may be created containing the bug fix and other bug fixes. A patch record is associated with each patch. The patch record includes identifying information such as a patch identifier (e.g., an alpha-numeric code), references to corrected or addressed bugs, textual description of the purposes of the patch, references to specific software useful with the patch (e.g., a specific user application, kernel software for specific operating systems, and the like), dependent packages, related patches, and other useful identifying and patch-user information.

While providing useful information to a system analyst, the volume of information in these bug and patch files usually grows into a very large, unmanageable amount of information (e.g., 500,000 and more bug entries for widely-used operating computer systems and networks), and the amount of data in these files continues to grow as new bugs and patches are identified, created, and installed. Hence, the task of identifying appropriate patches for an identified bug is a difficult task, and system analysts often resort to making educated guesses for searching these lengthy patch records.

Existing methods for identifying appropriate patches to correct bugs typically require users to provide important input or make critical choices and do not meet the needs of system analysts. System analysis methods and tools are typically fully or partially manual "search" processes involving manually entering search terms to process the large patch record lists, identifying potentially relevant patches, and then manually selecting one or more patches for installation. The existing systems are heavily interactive and require the system analyst to provide a relatively large amount of knowledge to obtain good results. For example, some system analysis tools require a user to select which problem analysis or resolution tool to use and to select which databases to search. The effectiveness of this tool is tied to the ability of the user to search a database containing a subset of possible problems with appropriate search terms. When a list of bugs or patches is obtained, the user again must manually, based on their experience, select the correct problem and a useful fix for the selected problem. Clearly, the existing "search" systems allow for human error to become a problem and are inherently labor intensive systems.

In addition, the first step of analyzing a resulting core file to accurately identify a bug causing the problem is an even more difficult task than the above "searching" processes. The core file analysis tools presently available are typically only useful for kernel core files and are difficult to effectively use (e.g., require extensive training and knowledge of the system being analyzed which often can only be gained with years of working experience). The tools are generally only used reactively, i.e., once a problem occurs, and are interactive with the user, i.e., are manual not automatic tools. Again, these tools are often ineffective as human error can result in an incorrect or inefficient remedy being recommended to correct the computer system operating problems.

Often, the operator is unable to identify a single, specific patch for the problem and is forced to install numerous patches to increase the likelihood that the bug will be corrected. This inaccurate "over" patching is often time consuming, costly, and disruptive to the computer system, which may not be acceptable to users of the system. Additionally, some patches are not effective or are counterproductive when installed with other patches. Further, some patch tools are available to identify patches that are installed on the computer system for which new versions are available (which in many systems are hundreds of patches at any given time), but these tools do not assist in identifying a particular patch for correcting an identified bug.

In addition, problems that a computer system may encounter are not limited to just software bugs. The problems may include hardware problems, configuration specific issues (hardware or software), performance problems, security issues, firmware bugs, availability issues, functionality problems, and other problems. These problems often have workarounds or procedures that operators need to be aware of and to act on.

Hence, there remains a need for an improved method and system for identifying and resolving current and potential computer system problems of all types. Such a method and system preferably would be configured to be used online and offline and require little or no operator training. Further, the method and system preferably would be useful as a planning tool such as by providing proactive analysis of computer systems.

SUMMARY OF THE INVENTION

The present invention addresses the above discussed and additional problems by providing an automated service guru system, and associated method, that functions as a proactive and reactive system analysis tool that eliminates human error that may occur at each level or phase in prior art systems. The system of the present invention is a "guru" in the sense that it effectively automates the internal expertise of a service organization to provide an automated approach to online and offline analysis of a user's computer system (including user and kernel core files and other date sources). In contrast to interactive debugging systems, the service guru system functions automatically to process an image of a computer system to identify which, if any, problem preconditions are satisfied (i.e., the proactive case) and then identifies particular problems from this smaller set that match a precise problem symptom description (i.e., the reactive case). The severity of the problem is determined and one or more patches or remedies are provided in a report. In this manner, the service guru system functions to selectively search all known problems to determine and recommend one or more patches or remedies to enhance operation of a computer system.

Generally, a method is provided for troubleshooting and attempting to prevent problems on a computer system. The method includes collecting or analyzing data corresponding to the computer system (e.g., configuration files, log files, kernel or user core dumps, and the like) and then accessing a knowledge store or database of previously identified problems.

More particularly, the method includes processing the data collected from the computer system such that later steps (or phases) do not need to know the source of the original data. Such processing of collected system data allows the method to be performed substantially identically in online and offline modes and in many embodiments, the method can be performed effectively without regard to the methods used to collect the system data. The collected and processed data includes any data or information useful to scripts located in the knowledge store, which, for example, may include operating system version, hardware configuration, packages installed, patches installed, core files, and the like.

Once the collected data is processed, the method continues with the system sequentially running a series of phases defined by and typically contained in the knowledge store. In a preferred embodiment, each phase includes a collection of well-defined scripts. Each script, in general, is associated with a unique problem or issue. The phases provide the function of categorizing the problems or issues. Typically, each script is responsible for determining if a particular problem or issue relates to a specific computer system and this function may be performed in two steps.

First, the script determines if any "preconditions" are needed for the problem to occur. The precondition determination allows the script to quickly complete if the problem is not applicable to the particular computer system. The determination also provides an indication that the problem may occur in future system operations, i.e., the method is truly proactive. Second, if the problem may occur in the system, the script determines if the problem or issue does apply. The information the script uses to perform these two steps is generally provided by the system in the first phase but preferably, the script is adapted to dynamically gather additional information if useful. Scripts may be written in any language supported by the system and are preferably designed to execute quickly and efficiently.

The method may include numerous addition phases to troubleshoot the computer system. According to one aspect of the invention, the method includes three phases that are optimized and function to screen, test, and resolve the large number of bugs that typically are known for computer systems. The first bug phase is identified as a "bug screen." The bug screen phase involves consulting a database in the knowledge store to divide all known bugs into categories. In a preferred embodiment, the bugs are divided into the following four categories: (1) bugs fixed by patches currently loaded or not applicable; (2) bugs not fixed and possibly present or applicable; (3) bugs which could be introduced by an upgrade in software version; and (4) bugs which could be introduced by a downgrade in software version. Generally, the method is most interested in identifying bugs in the second category, and the other categories can be used for software version planning or overriding the screening process. By categorizing the known bugs, the bug screen phase dramatically and quickly enhances later phases by reducing the number of bugs to be processed (i.e., typically only the bugs in the second category).

The next bug-related phase is identified as a "bug test" and involves processing the bugs selected by the previous phase by running a script for each bug. The scripts are located in the knowledge store. The scripts preferably process the system data supplied by the system and/or more preferably process kernel core or user core files. The output of the bug test phase is a list of bugs that may apply to a system. In one embodiment, the list of bugs is created both proactively and reactively.

The final bug-related phase is identified as "bug resolution." Bug resolution functions to coalesce the bugs output from the bug test phase and then sort the output bugs by severity and level. The bug resolution phase includes determining and listing with each bug any applicable patch or workaround.

According to another aspect of the invention, the method includes a phase identified as "hardware error scan." The hardware error scan uses a database, such as one stored in the knowledge store, listing hardware error strings and associated descriptions and resolutions. The hardware error scan scans select data sources for matching hardware errors and then displays or reports matches with recommended actions.

The method may include a phase identified as "coretool" that is fully described in U.S. patent application Ser. No. 09/781,832, entitled "Automated Analysis of Kernel and User Core Files Including Searching, Ranking, and Recommending Patch Files" that was filed Feb. 12, 2001 by the same inventor as the present application and which is incorporated by reference herein.

According to yet another aspect of the invention, the method includes a phase identified as "process report." In general, other phases of the method are adapted for simplicity and, as such, may not generate human-readable output. The process report phase is included to parse all or portions of the other phase outputs and to generate a human-readable report, such as an analysis report in HyperText Mark-up Language (HTML) form. For example, a reference in a report to a bug that applies to a computer system would include a synopsis (preferably automatically extracted) and uniform resource locator (URL) links to a full bug description, a patch binary, and/or other information useful to a system analyst.

DETAILED DESCRIPTION OF THE PREFERRED EMBODIMENTS

Figure 1:
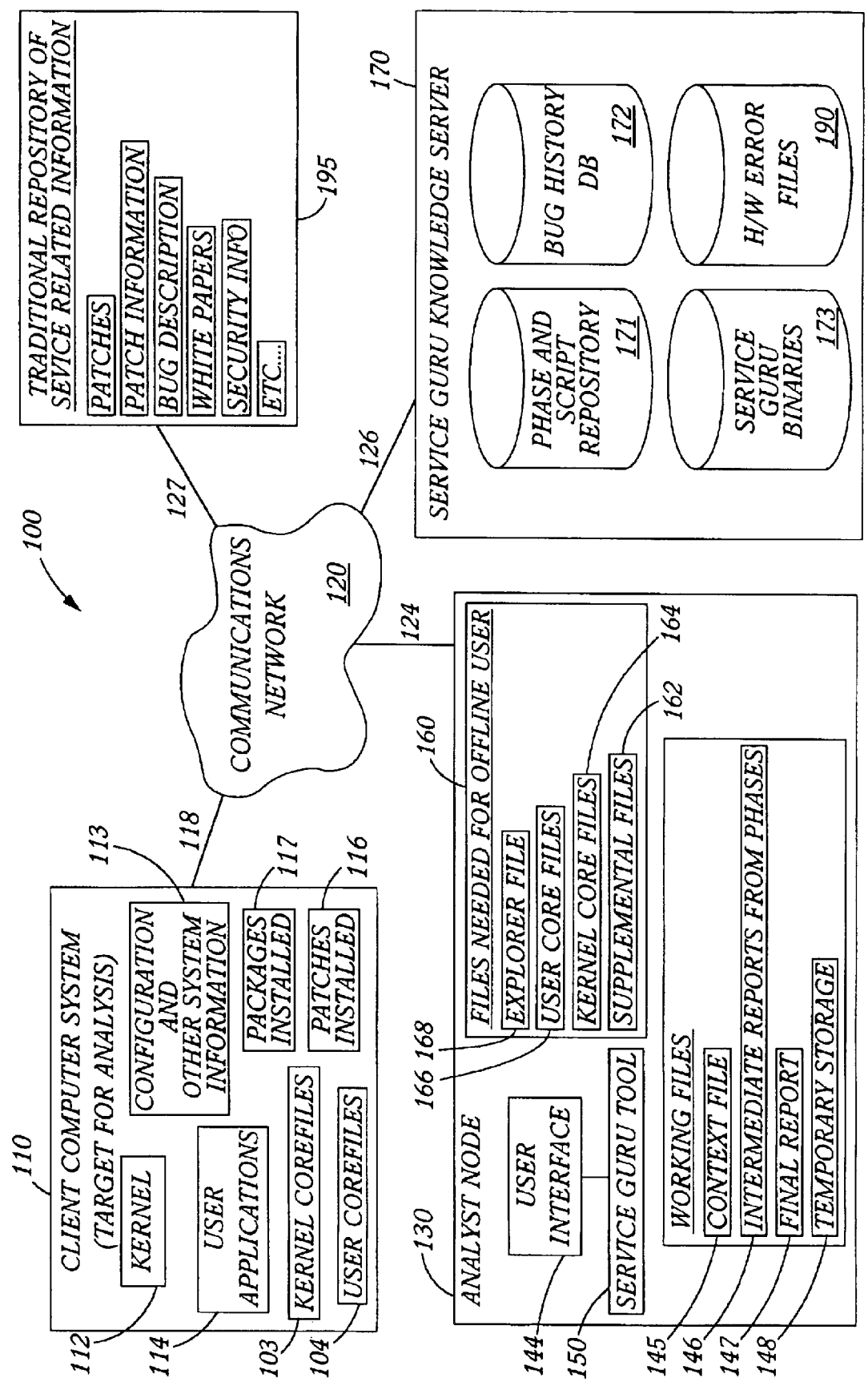
FIG. 1 is a block diagram illustrating an automated service guru system with a service guru tool for automatically analyzing a target client computer system based on kernel and user core files and additional system configuration files.

FIG. 1 illustrates a client/server embodiment of an automated service guru system 100 configured to provide automated troubleshooting and preemptive analysis of computer systems and recommend corrective actions. The client/server implementation of the invention is intended as an exemplary embodiment, not as a limitation, as the inventive features of the service guru system 100 may be implemented in less complex computer systems as well as more complex systems that would be apparent to those skilled in the computer arts when provided with the following description.

As illustrated, the service guru system 100 includes a client computer system 110 which may be any well-known type of computer system adapted for executing software programs, such as one or more servers and memory devices executing user software and an operating system. The client computer system 110 is a computer system that is a monitored or targeted system for debugging and system analysis when a crash or less serious operating problem occurs. As illustrated, the client computer system 110 is executing kernel software 112, user applications 114, and installed packages 117 and has additional configuration and system information 113 in system memory. Additionally, one or more patches 116 have previously been installed on the client computer system 110.

In a preferred embodiment, the client computer system 110 is adapted for creating a memory image (i.e., a core file) providing byte sequence-type state information for the executing kernel software and/or user applications (such as at the time of a system crash). The core file typically also includes information that indicates the program that was executing at the time of the unexpected interrupt, provides a description of the program, and describes or otherwise indicates the type of interrupt (e.g., the type of panic) within fault or panic messages. For example, a kernel core file and, at least in some embodiments, a user core file is created at a selected time, such as upon a crash or an unexpected interrupt, and these core files and other system files are analyzed within the service guru system 100 to identify existing bugs and recommend patches and/or corrective actions.

Additionally, the service guru system 100 is preferably data source independent and can process or analyze information pertaining to the operation of the client computer system 110 from numerous sources and having a variety of formats and arrangements. Often, this information may be collected by accessing the client computer system 110 to determine operating information, such as operating system in use and the like. Much of this type of information may be retrieved from the configuration and other system information 113 in memory on the client computer system 110.

To this end, the client computer system 110 typically would include processing mechanisms (such as a CPU) for performing logic, computational, and decision-making functions, memory devices, and an operating system (e.g., Solaris™, MS-DOS™, UNIX™, PICK™, or other OS) to manage the operation of the client computer system 110. The particular processing mechanisms, memory arrangements, and operating systems are not critical or limiting elements of the system 100. The system 100 is useful with a wide variety of client computer system 110 configurations and modifications of the system 100 to suit particular configurations would be understood by those skilled in the computer arts. Typically, the kernel 112 or kernel software operates within the operating system and comprises the system-level commands (i.e., executables or executable files), such as device drivers, memory management routines, the scheduler, system calls, and the like. Analysis of the kernel 112 is typically an important part of performing a dump or core file analysis.

As illustrated, the client computer system 110 is in communication with an analyst node 130 that functions, at least in part, as a proactive and reactive troubleshooting or service mechanism via communications links 118 and 124 and communications network 120. In turn, the analyst node 130 is in communication with a knowledge database server 170 via communications link 126 and network 120. The communications network 120 may be the Internet, an Intranet, or other useful data communications network with the links 118, 126 being digital data communications links (wired or wireless) selected to accommodate data transfer over and between the network 120, computer system 110, the analyst node 130, and the knowledge database server 170.

In one embodiment, the client computer system 110 and analyst node 130 are components of a wide area network (WAN) but, as will be understood by those skilled in the computer arts, the invention is useful for other network arrangements and even for non-networked devices (not shown). In a further embodiment, the client computer system analysis features of the analyst node 130, and, more specifically, of the service guru device 150 discussed below, are included as elements of the client computer system 110.

As illustrated, the analyst node 130 is able to receive data (such as core files and analysis requests) from the client computer system 110 or from separate systems and devices and to retrieve information from the client computer system 110 (such as determining the installed software packages to narrow problem searching and gathering information on the installed patches 116 and installed packages 117). Of course, this information can be transferred in other non-network methods, such as transfer of a CD-ROM or other data storage device, which are considered within the breadth of this disclosure.

According to a significant feature of the invention, the service guru system 100 includes problem analysis functionality with the analyst node 130 for automatically analyzing a kernel or user core file and other system information in a reactive and proactive manner and producing reports indicating identified problems or bugs and recommended fixes or patches as well as providing other analysis information. In this regard, the analyst node 130 is connected via communications link 124 to the communications network 120 and client computer system 110 and knowledge database server 170. Typically, when the client computer system 110 experiences an unexpected interrupt (such as a system hang or crash), the system 110 via its operating system (not shown) or otherwise operates to create a kernel core file and/or a user core file that describe the existing state of these executables or programs. These core files are then transmitted with an analysis request (or the system 110 may be monitored on an ongoing or semi-continuous basis by the analyst node 130) over communications links 118, 124 and network 120 to the analyst node 130. The analyst node 130 includes memory 160 to store the kernel core files 164 and the user core files 166 (of course, these files 164, 166 and other information (such as configuration and other system information 113) used by the service guru system 100 may be stored in numerous locations within the system 100 as long as the information in the files is accessible by the analyst node 130).

As will be explained in more detail, the analyst node 130 in some embodiments is operable in an online mode in which communications are open between the analyst node 130 and the client computer system 110. Alternatively, the online mode may readily be achieved by having the analyst node 130 and the client computer system 110 combined within the same computer or computer system (not shown). In this mode, the analyst node 130 is operable to retrieve information from the client computer system 110 during client system problem analysis.

In the "offline" mode, sufficient supplemental information is or has been gathered from system 110 (including, for example, core dumps and key operating system files from the configuration and other system information 113) to facilitate analyst node 130 in performing automated problem analysis independently from system 110. Explorer™ is one of many tools that is useful for gathering the key operating system files, which include the list of installed packages 117, the list of installed patches 116, and mapping of installed binaries to packages (e.g., the "contents" file on Solaris™). In some cases, all of these supplemental files may not be available, and in these cases, it is useful for the analyst node 130 to be adapted to use techniques to estimate portions of the data in these files. This estimation process can be used, for example, to create an upper bound on the list of kernel packages.

The analyst node 130 may be a computer system similar to computer system 110 (or be within the system 110). For example, the analyst node 130 may include one or more servers with executing software or objects, input/output devices, data storage devices, and one or more user terminals (e.g., desktop computers, notebook computers, and the like with modems, I/O ports, keyboards, and displays). As illustrated in FIG. 1, the analyst node 130 includes a user terminal with a user interface 144 for interfacing with and/or calling a service guru tool 150 and interfacing with the client computer system 110. The service guru tool 150 operates to automatically process the client computer system 110 information using first an analysis based on preconditions and second a phase-by-phase analysis (as will be explained with reference to FIGS. 3 and 4).

An operator, e.g., a system analyst, operates the user interface 144 to provide, select, and/or modify execution criteria (in some embodiments) and to view and/or manipulate the detailed reports produced by the service guru tool 150 after each analysis phase and/or after a completed analysis (as will be explained in detail). In some operating modes of the service guru system 100, the analyst node 130 may also be operable for directing the service guru tool 150 to a location at which to retrieve dump and client computer system 110 information (e.g., by providing directories, paths, and the like).

According to an important feature of the invention, the analyst node 130 includes the service guru tool 150 to provide automated analysis of the computer system 110 and, particularly, of the kernel core files 164 and the user core files 166 (as well as other data sources) and to produce a report(s) indicating identified problems and corrective actions. The service guru tool 150 comprises one or more software applications to accomplish its functions. Briefly, during operation of the system 100, the service guru tool 150 functions to communicate with the memory 160 to retrieve and analyze the kernel core files 164 and the user core files 166 and other data sources (as applicable). The service guru tool 150 is configured to retrieve installed packages 117 (or at least listings of such packages), installed patches 116, and configuration and other system information 113 from the client computer system 110 and/or to receive analysis information from the analyst via the user interface 144.

An important function of the service guru tool 150 is searching for applicable or relevant patches for correcting any identified bugs or problems in the client computer system 110. To this end, the service guru system 100 includes the knowledge database server 170 communicatively linked to the analyst node 130 for use by service guru tool 150. The knowledge database server 170 includes: a phase and script repository 171 comprising a collection of short programs executed from within the service guru framework; a bug history database 172 comprising information on when bugs were created and resolved; and the service guru binaries 173 comprising the tools and executables supporting the service guru tool 150.

Figure 2A:
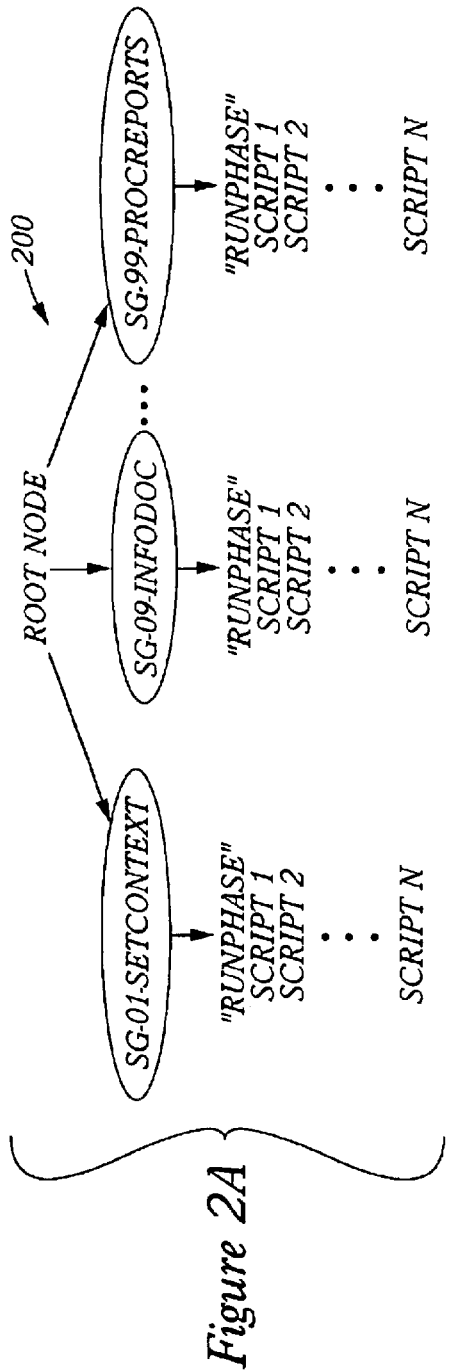
FIGS. 2A–2C illustrate exemplary data files that can be used on the service guru system of FIG. 1.

In one embodiment, the repository 171 is a file system hierarchy 200 as shown in FIG. 2A. Each directory under the root node represents a named service guru phase operable by the guru tool 150. Each directory in turn contains a plurality of scripts useful in analyzing the computer system 110. Typically, there is one script per unique problem or issue handled by the service guru system 100. In addition, there is a preferably a unique script called "runphase" that is configured for executing each phase. With this design, new phases and scripts can easily be added or the scripts can be reordered without requiring modifications to the service guru tool 150. Of course, since the service guru tool 150 can be adapted to support multiple programming languages, the scripts preferably have extensions on their file names that determine or identify the programming language (e.g., .ksh, .nawk, and the like).

Figure 2B:
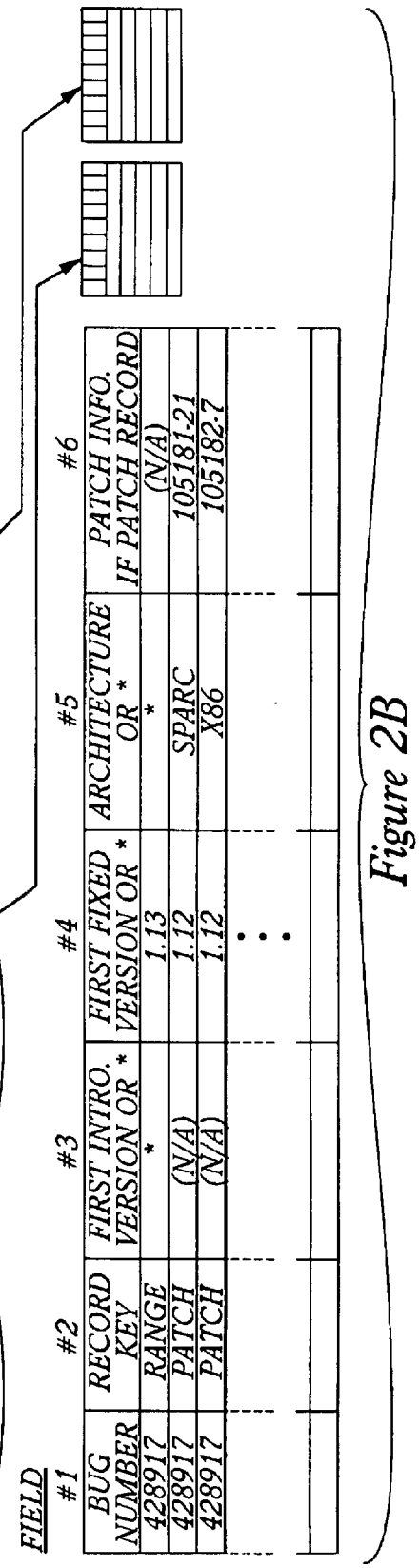

In one embodiment, the bug history database 172 is a file system hierarchy 210 as shown in FIG. 2B. Under the root node is a series of directories with one directory per possible software package name. A simple tabular database is in each directory with the following exemplary fields: (1) bug number; (2) record key (e.g., either "range" or "patch"); (3) first package version in which the bug exists (or "*" or other indicator if the bug always existed); (4) first package version in which the bug has been fixed (or "*" or other indicator if not yet fixed); (5) architecture of the package if multiple architectures (e.g., SPARC, X86, and the like); and (6) patch information if record key field is "patch."

This database structure 210 contains two record types. The "patch" record type indicates a specific version which has a patch available. In a patch record, the third field is not used. The "range" record type is a record that describes a continuous range of package versions which contain a bug. In a range record, the sixth field is not used. The combination of both record types allows the service guru tool 150 to determine which package versions are susceptible to a bug and what patch, if any, is appropriate for installation.

In practice, the knowledge server 170 and the traditional service repository 195, shown in FIG. 1, can be functionally combined on the same server. In one embodiment, this unification of data storage is used to yield significant savings in maintenance and general upkeep of the data repositories.

With a general understanding of the network environment of and the components and data structures of the service guru system 100 understood, the operation of the service guru tool 150 is now fully described with reference to FIGS. 3A–3H and 4. FIGS. 3A–3H illustrate exemplary general functions of the service guru tool 150. FIG. 4 provides a more detailed illustration of example phases that may be utilized in the phased analysis function shown in FIGS. 3A–3H.

Figures 2C, 3A:
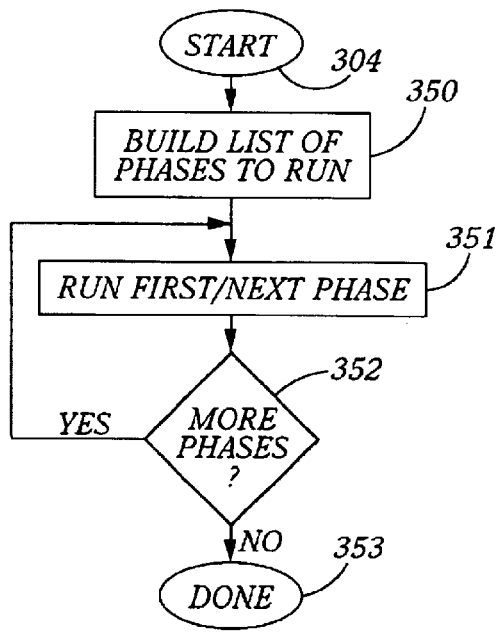
FIGS. 3A–3H are flow diagrams showing a problem analysis carried out by the service guru system of FIG. 1.

Referring first to FIG. 3A, operation of the service guru tool 150 begins at 304 with the tool 150 being called at the analyst node 130 such as via the user interface 144 in response to a request from the computer system 110 or by a third party device (not shown). In this regard, the user interface 144 may be any useful computer interface including a graphical user interface (GUI) designed in some cases to hide the complexity of the tool 150. If a GUI is utilized for user interface 144, preferably the GUI is configured for allowing an operator to provide input and/or make selections during operation of the tool 150, such as selecting specific analysis parameters or conditions to be used throughout the analysis or in a particular portion or phase (e.g., to input specific operating systems, patches, packages, and the like to apply during analysis).

Figure 3B:
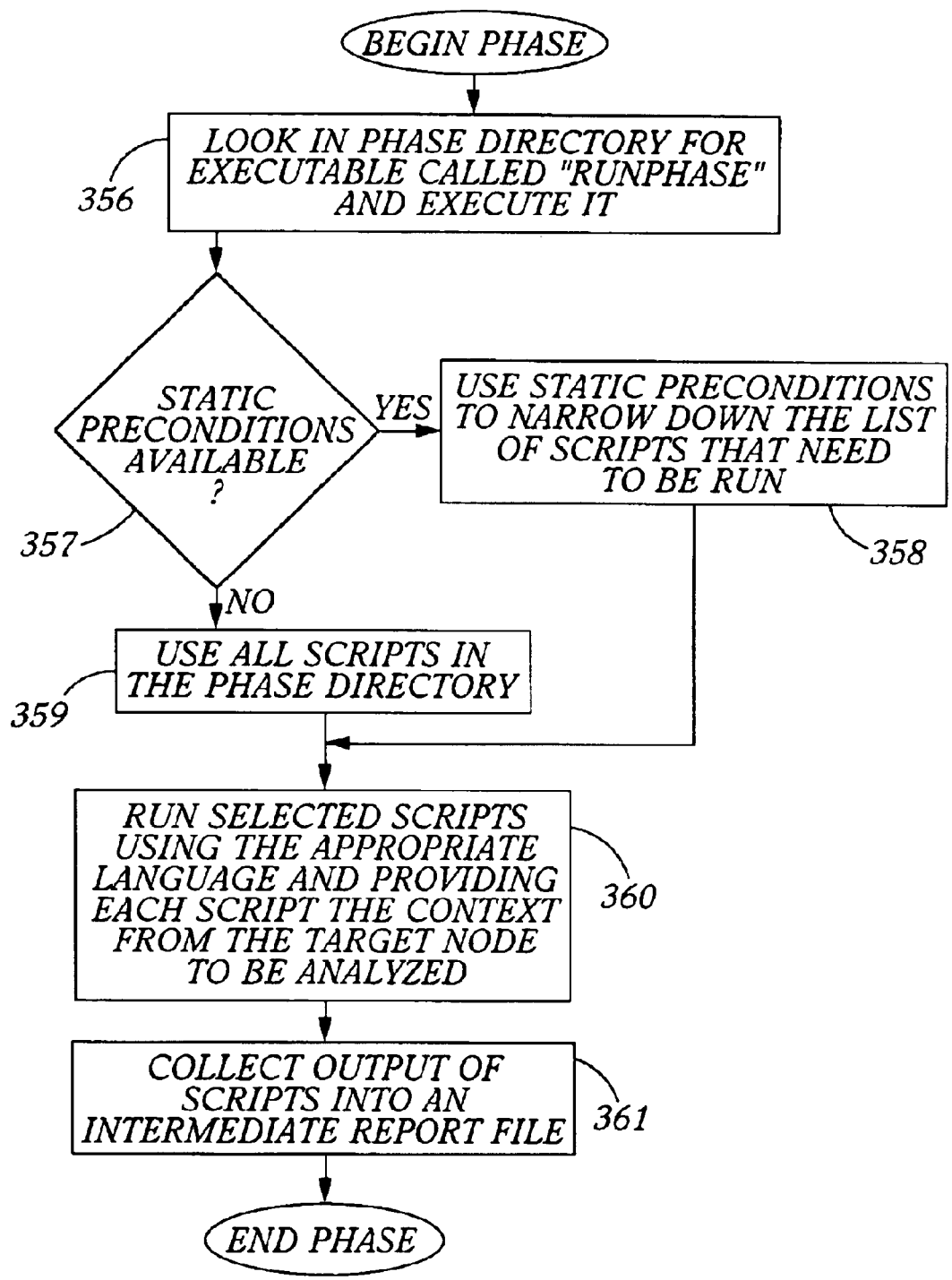
Figure 3C:
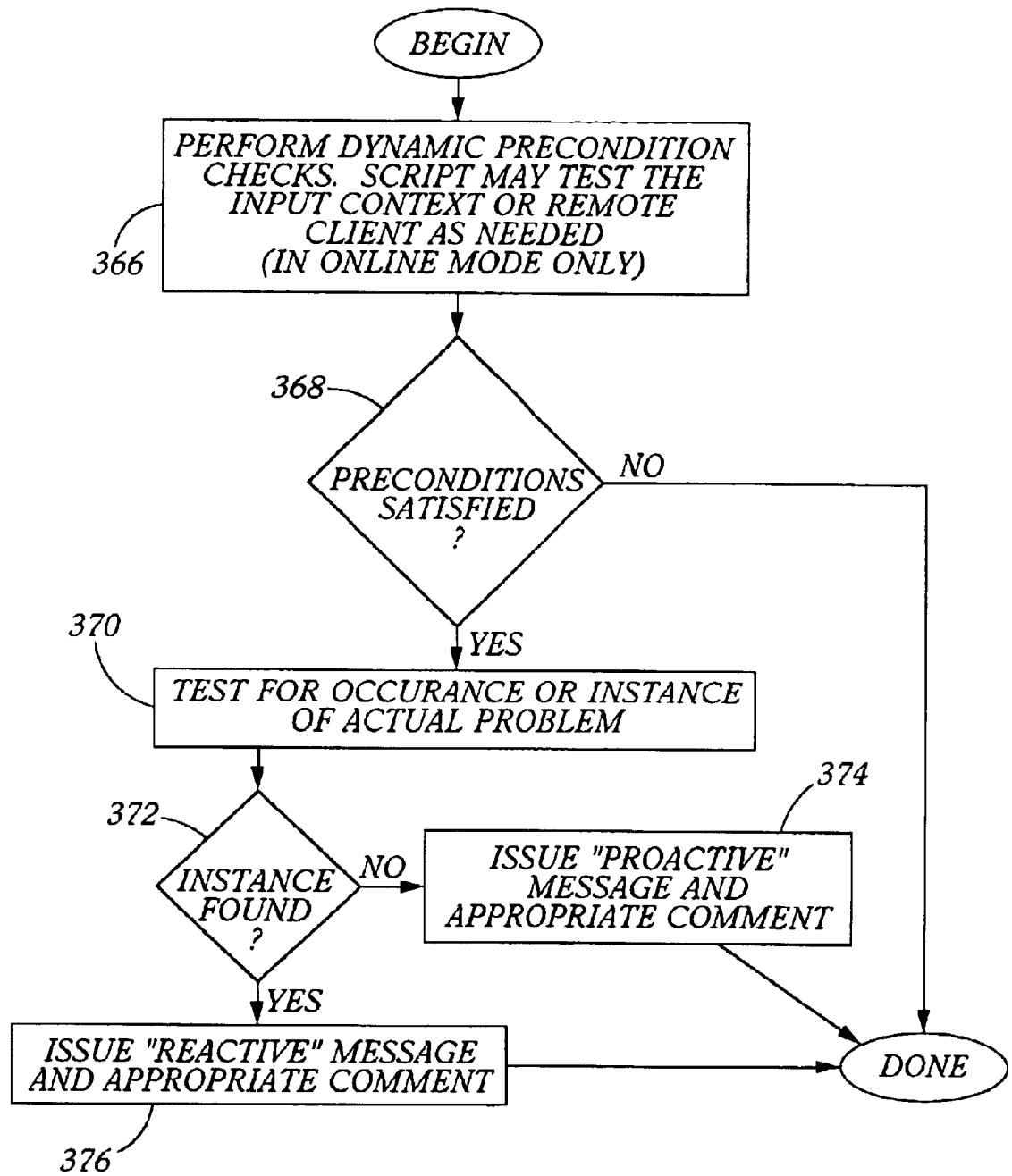
Figure 4:
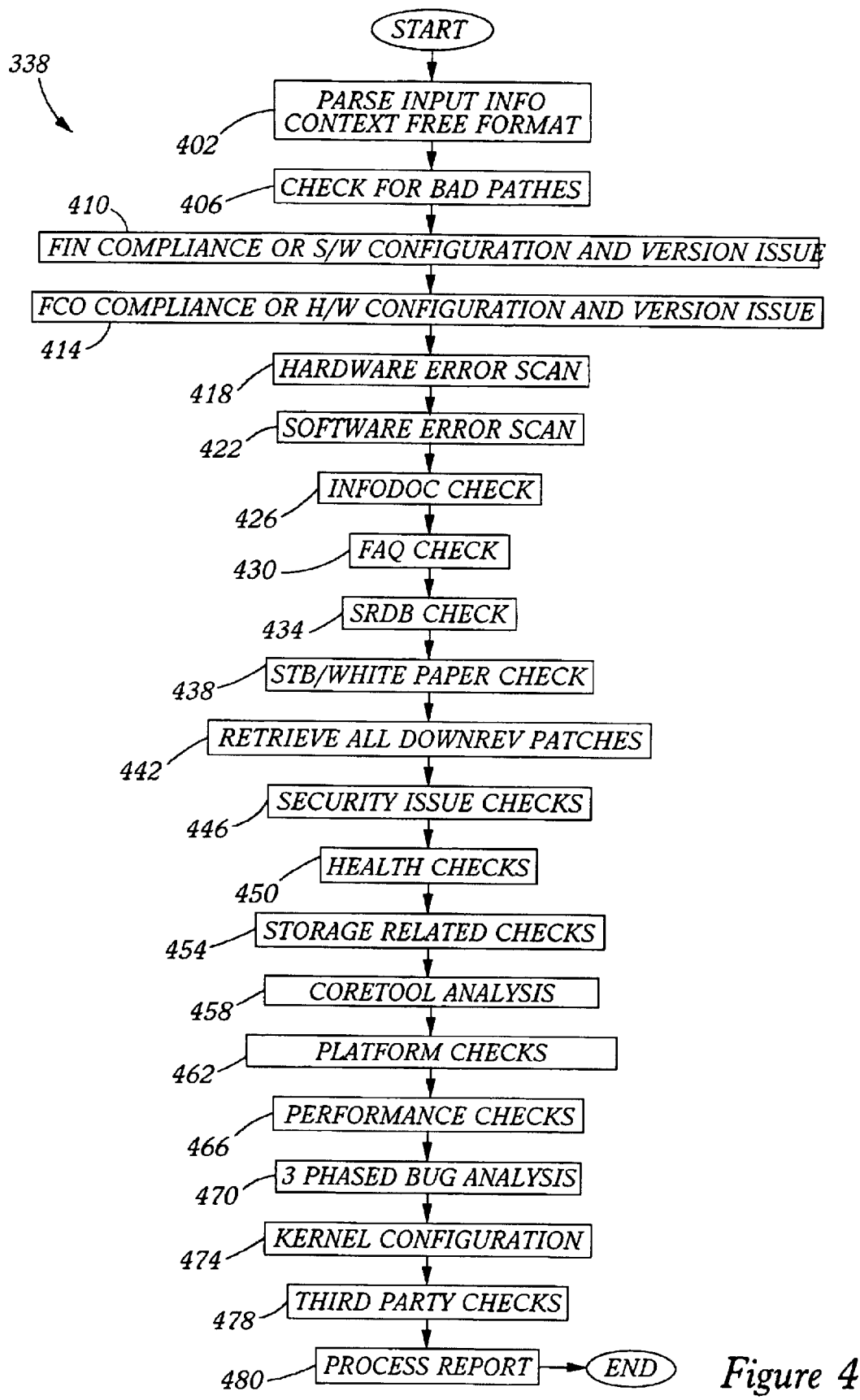
FIG. 4 is a flow diagram providing additional details of the phase-by-phase analysis of the process shown in FIGS. 3A–3H.

FIGS. 3A, 3B, and 3C illustrate the general execution flow of analysis of the computer system 110 by the service guru tool 150. In FIG. 3A, the main executable service guru tool 150 is responsible at 350 for querying the knowledge server 170 and building a list of phases to run from the phase and script repository 171. The executable then at 351 runs the phases in the built list, and preferably in sequential order. In this manner, the tool 150 is functionally driven by the data maintained and stored in the service guru knowledge store or server 170. The service guru 150 determines if more phases are to be run at 352 and repeats running phases until the list is completed at 353.

Referring to FIG. 3B, the general operation of an exemplary phase run by the service guru tool 150 is illustrated. Note, the flow shown is for illustration purposes only and is not intended to be limiting as other phases may use different flow, as will be described in more detail. At 356, the main executable in tool 150 looks for a binary called "runphase" to facilitate the phase being run. At 357 and 358, a set of static preconditions are applied to reduce the number of scripts which will be run during the phase. For example, if it is known that a set of scripts only applies to a specific release of software or an architecture version, this set of scripts can be quickly eliminated if not applicable to the target configuration, e.g., the configuration of the computer system 110.

The static preconditions checked at 357 may include but are not limited to operating system, operating system release, software package, software package version, system architecture, platform, patch level, and panic or message buffer string. In a preferred embodiment, the service guru tool 150 is adapted to accept ranges for at least some of the above preconditions rather than just a single value.

If static preconditions are not available, all scripts will be considered or run at 359 (with some loss in performance). At 360, the phase continues with execution of all selected scripts from 358 or 359. The scripts may be run in any useful order and in one embodiment, are run in parallel for improved speed. Each script is provided context information from the target system 110 so it can determine any needed values (e.g., operating system version, patch lists, locations of core files, and the like). At 361, the output from the scripts run at 360 is combined into an intermediate report for immediate or preferably later processing.

FIG. 3C illustrates an exemplary process flow for a single script within a phase. Again, scripts may be written in any language that is supported by the service guru tool 150. Each language has its own strengths and by adapting the tool 150 to support a plurality of languages, a truly flexible system 100 is provided by the invention. At 366, the script performs dynamic precondition checks. These tests can take many forms and are not limited to select system variables (like the static checks of 357). The dynamic checks are aimed at determining if the specific problem or issue could occur on the target system 110. If the preconditions are not satisfied at 368, the script exits with no output.

If the preconditions are satisfied at 368, the script continues at 370 with testing for occurrence or instance of the actual problem. If the problem did occur and an instance is found at 372, the script issues at 376 a "reactive" output message with a problem specific and appropriate comment and/or recommended action. If not found at 372, then the script continues at 374 by issuing a "proactive" output with comment and/or recommended action.

Significantly, the service guru tool 150 is based on a brute force-type of algorithm that uses screening to improve run times. Service guru tool 150 does not require an operator to provide input needed to perform an analysis of the computer system 110 or needed to effectively and efficiently perform the analysis and provide a useful recommendation of corrective actions. To this end, the service guru tool 150 has the ability to process a large amount of information related to the operation and configuration of the system 110 and to perform a brute force analysis of potentially every bug and patch having a record in the knowledge database server 170. The run or operating time for the service guru tool 150 may be a few seconds, minutes, or even hours to process the large amount of information. However, even these longer processing times represent a large improvement in time and accuracy over existing troubleshooting processes.

One preferred embodiment of the service guru tool 150 involves periodic running or operation for select target computer systems 110. In an alternative embodiment, the service guru tool 150 is operated on an ongoing basis to monitor and analyze the system 110. In this embodiment, the service guru tool 150 operates to respond to changes in the computer system 110 and to updates to the knowledge database server 170 information by performing additional analysis. This can be achieved by initially scanning all relevant files, message buffers, and other sources of computer system 110 information and then only scanning new messages or modification alerts.

Figure 3D:
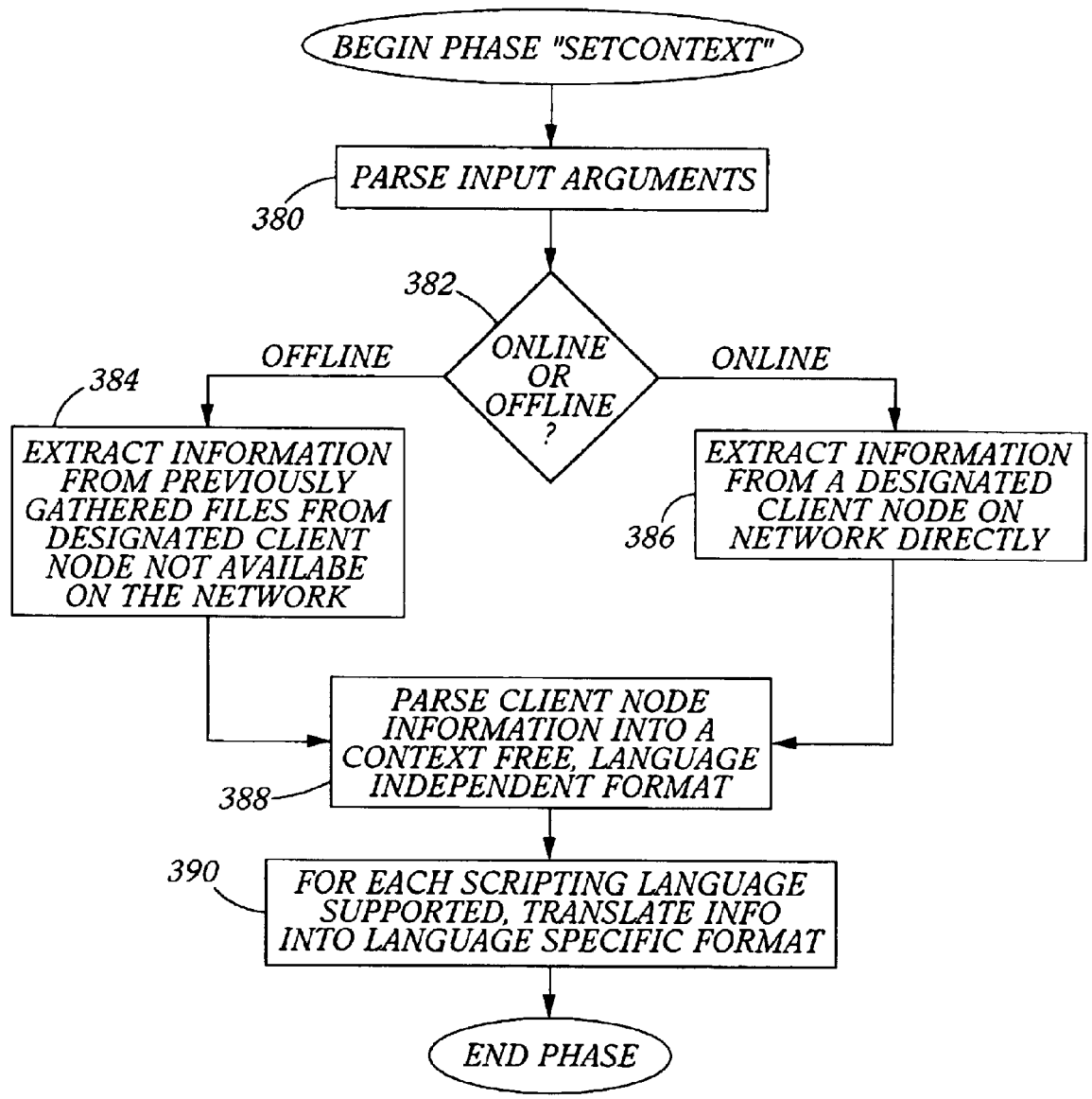

Referring to FIG. 3D, a preferred first phase (labeled "setcontext") to be run by service guru tool 150 is illustrated and described. At 380, the initial input parameters are parsed. These parameters contain information about the target node or system 110. Significantly, at 382, the setcontext phase determines if the phase is being run online (i.e., at the customer's site) or offline (i.e., at a separate location in communication with the system 110). This determination is useful in following steps for facilitating selection of the amount and the type of system information that can and should be collected from the system 110. For example, for online analysis, the service guru tool 150 is configured to take advantage of a higher percentage of system information, such as configuration and other system information 113, rather than potentially being limited to a smaller data collection subset like an Explorer™ file 168. When running offline, the tool 150 accepts data from collection tools such as Explorer™ and to collect any available supplemental data such as user and kernel core files 112, 114 and installed packages 117. In some cases, running offline may cause the service guru tool 150 to cancel certain analysis phases due to a lack of system information, which is then noted on an output report.

Service guru tool 150 is preferably adapted to operate with data source independence meaning that the source of the collected analysis is relatively transparent to the tool 150 operation (i.e., the tool 150 operates effectively on an Explorer™ file 168 or a live system and on a core dump 164, 166 or /dev/kmem).

Referring again to FIG. 3D, the set context phase continues in offline mode at 384 by extracting information from previously gathered files from the target node 110 that is typically not available on the system 100 or network. In online mode, the phase continues at 386 with the extraction of information directly from a designated node, such as system 110, on the network of system 100. Both modes continue at 388 with parsing client node information into a context free, language independent format and at 390 with the translation (for each scripting language supported) of the parsed information into a language specific format.

According to a significant feature of the invention, the service guru tool 150 is operable with an ordered phase-by-phase analysis that involves passing analysis results from one phase to the next to allow more effective and thorough analysis. In this manner, the service guru tool 150 is operable to process or check every bug and patch in the knowledge database server 170 with controlled and enhanced run times.

Referring to FIG. 4, a flow chart is provided illustrating examples of the types of analysis phases or functions that are performed or run by the service guru tool 150. While the analysis phases are shown in a specific order, the tool 150 may operate with only selected phases being performed for all or select sets of bugs based on operator input, information in the collected system information, or other parameters. Additionally, other phases not shown may be performed to further analyze the system information and the bugs and patches in the knowledge database server 170. Preferably, the phases are performed in order with the most important checks or phases being performed earlier in the process 338 but numerous orders may be useful to practice the invention. Further, the number of phases and functions of each phase can readily be expanded to enhance the analysis of the system 110.

Further, the phases preferably create and output partial analysis results that can be used by subsequent phases (e.g., which is why ordering the phases is preferred but not required). The partial analysis results preferably are in the form of parsable output that can be understood by later phases and can be combined into a customer readable report. In some cases, specific phases may have different goals and the report formats may vary (as long as the reports are useful for later phases). For example, the hardware error scan phase may report as output a partial message file contents to show context and include HTML links back to a description or action database. Other phases, likewise, may have unique report output content and formats. In some embodiments of the tool 150, each or select phases may output an interim report rather than simply being included in an "all phase" report. This may be useful for important, i.e., high severity, matches found between a bug and a problem in a client system 110 to obtain more rapid corrective response. Further, these interim reports may be automatically or manually transmitted or directed to service personnel or groups or the client computer system 110 via the communications network 120 or otherwise to initiate correction of the problem.

At 402, an initial phase is performed to parse all of the gathered input from the computer system 110 into a context free format as described in detail with reference to FIG. 3D. This phase allows the phases to be designed to not require data to come from a certain source or in a certain format (e.g., data can be from live system 110, core files 164, 166, or other sources) In one embodiment, this parsing is performed by including in the tool 150 parsers for each anticipated data input type/version. The resulting intermediate context file is independent of both the input data source and any specific language syntax, with an exemplary resultant programming language independent "context" file shown in FIG. 2C. Significantly, for each language supported by the service guru tool 150, the context file is then a translated input file that serves as the input environment for later running or operating phases. As a result of phase 402, the later phases can be written in nearly any language with reference to data on a target system 110 without having to parse explorer tools or run live commands. Further, the input data processing of step 402 increases the speed of later phases and, hence, the overall analysis process 300.

Once the input data is parsed, the phase-by-phase analysis 338 continues at 406 with a check for bad patches, which may involve a comparison of the installed patches 116 with the patch files 180. Next, at 410 and 414, a field information notice (FIN) compliance (e.g., software configuration and version issue testing) and a FCO compliance (e.g., checking for hardware configuration and version issues) are completed. At 418, a hardware error scan is performed involving scanning the hardware error files 190 for matches with the computer system 110 input and recommending appropriate and preferably, platform specific, corrective actions.

At 422, the phased analysis continues with a software error scan 422 of the input information followed by an infodoc check 426, a faq check 430 (e.g., an analysis of the input information relative to stored data on frequently asked questions), and a srdb check 434 of the input information collected from the system 110. The output from these phases is passed to the next phases which include a stb/white paper check 438, retrieval of all down revision patches from patch files 180, and a security issue check 446. Note, infodoc check 426, faq check 430, srdb check 434, and stb/white paper check 438 are specific to Sun Microsystems, Inc. operations and system but are intended to provide examples of checks or categories of information and/or solutions to common problems and issues within computer systems.

At 450, a health check phase is performed and includes many items of general interest that affect the overall reliability, availability, and serviceability of the target system 110. At 454, storage related checks are performed that verify the integrity of the low level storage systems (e.g., A1000, A3000, A5000, and the like which are again Sun Microsystems, Inc. examples but are representative of similar systems used industry-wide that may be utilized within computer systems). It also includes checking of layered storage software such as volume managers and file systems. At 458, the tool identified as "coretool", described in a previous patent application filed by the same inventor and incorporated by reference herein, can be run on the target system 110. At 462, a series of platform specific tests are run (e.g., to verify hardware integrity and platform status, hardware leads, hardware register dumps, and the like) At 466, a series of performance related checks may be run on the collected data (e.g., check configuration files for issues that may cause performance problems).

Next, at 470, the phased analysis continues with an important bug analysis phase or phases. Bug analysis 470 may comprise a screening of the identified bug files 172 in the knowledge database server 170 to rule out or eliminate bugs that cannot apply to the target computer system 110 based upon system parameters such as loaded packages 116, versions of operating systems or applications, patch levels, and other factors noted in the bug files 172. Generally, the output report from this portion of the bug analysis is in one of the following categories: bugs fixed by patches currently loaded on system 110; bugs not fixed and present in the current package, version, and patch level (which is a significant finding or result in most analyses 338); bugs that would be introduced by an upgrade; and bugs which would be introduced by a downgrade. This portion of the bug analysis 470 is important for narrowing or reducing the number of bugs that need to be further analyzed from a very large number to a more manageable number (e.g., from hundreds of thousands down to a few hundred or few thousand). Additionally, this screening is useful for planning system 110 software upgrades to maintain consistent patch levels for bug fixes.

Figure 3E:
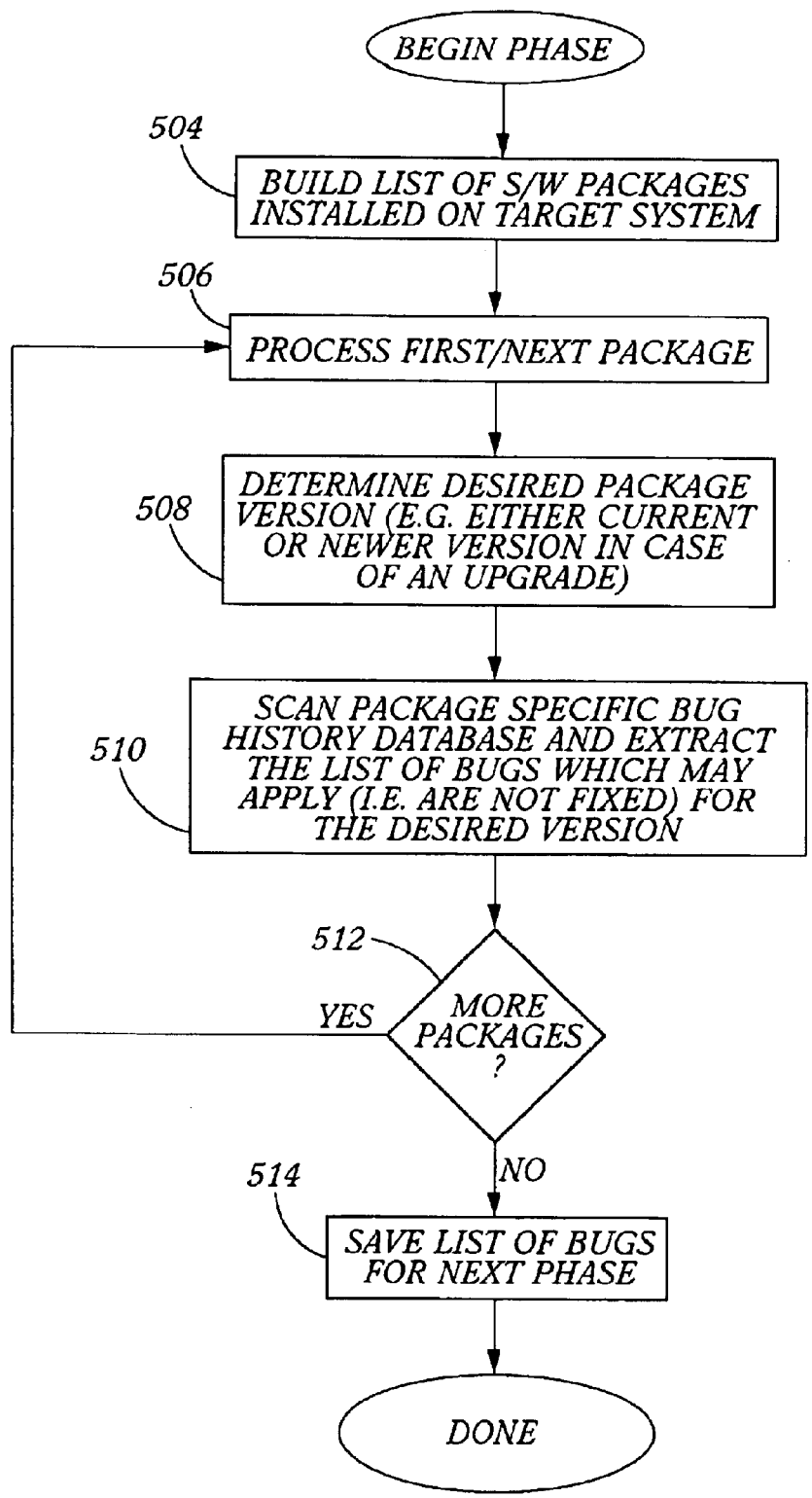

More specifically, referring to FIG. 3E, one preferred embodiment of a bug screen phase of the bug analysis 470 is illustrated. As shown, the bug screen phase begins at 504 with building a list of software packages installed on the target system 110. At 506, the next package is processed and at 508, the bug screen phase selects the desired package version (e.g., either current or newer version in case of an upgrade). At 510, the package specific bug history database is scanned in order to extract the list of bugs which may apply to the package (i.e., the bugs that are not fixed) for the desired package version. At 512, the phase checks for more packages to screen and if none, the screening phase continues at 514 by saving the list of identified applicable bugs for the next phase to be processed by the tool 150.

Figure 3F:
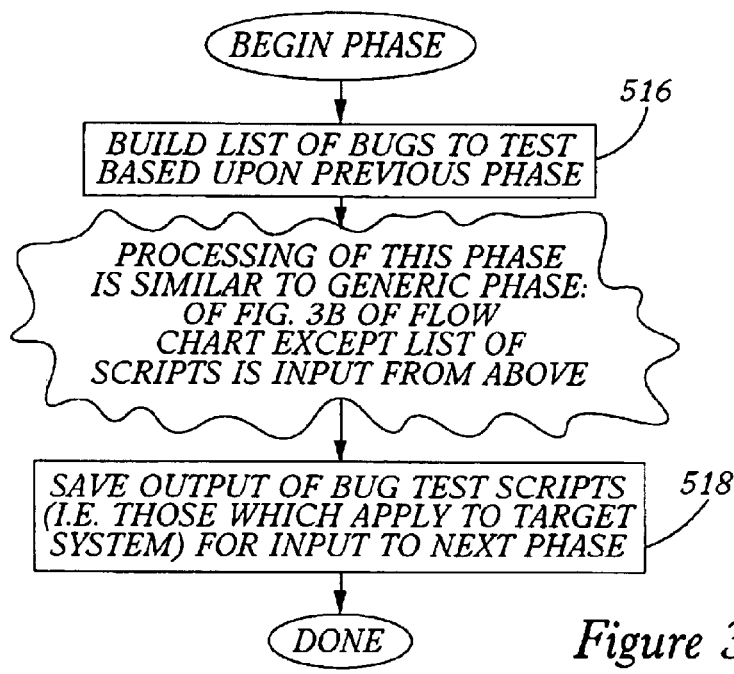

Referring to FIG. 3F, bug analysis 470 may continue at 516 by building and processing the list of bugs from the screening phase to determine for each bug if any of the input kernel core files, user core files, live system information, or other collected data matches the symptoms of the bugs in the identified bug files 172. As shown, the processing of the bug test phase is similar to that of a generic phase (which is shown in FIG. 3B and not elaborated on here) except that the list of scripts is input from above. At 518, the output of this portion of the bug analysis 470 is saved for input to next bug analysis phase and is a list of bugs that match the problem in the computer system 110 based on the collected information (e.g., based on the dump files or files from the live system).

Figure 3G:
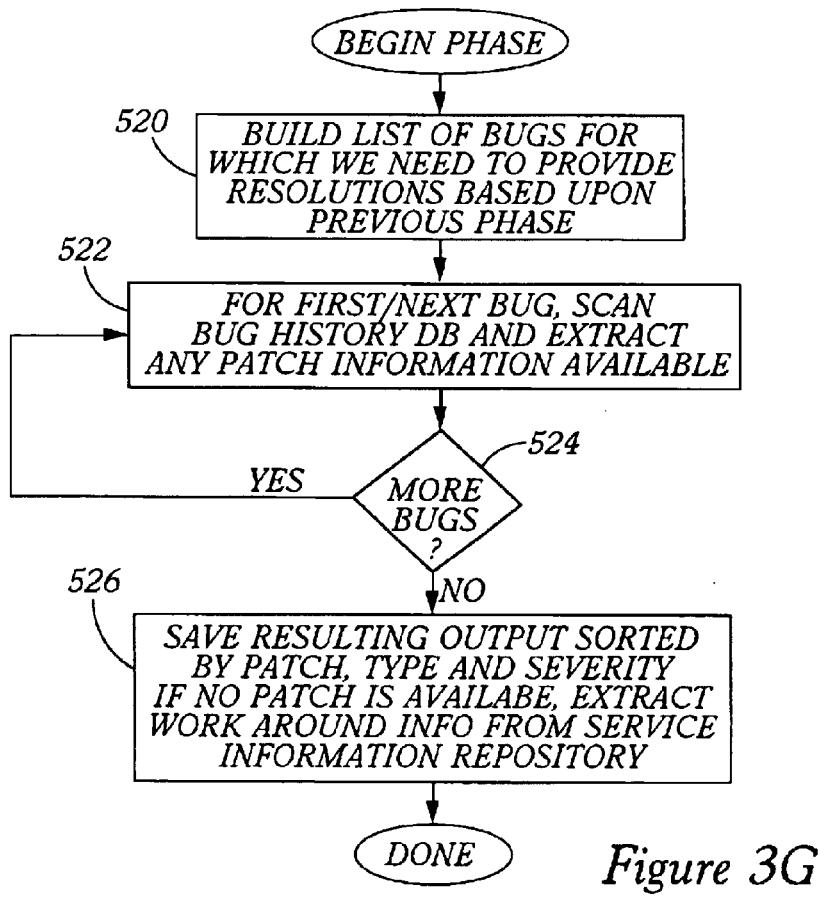

After the bug test phase, the bug analysis 470 continues as shown in FIG. 3G with a bug resolution phase. This phase is a processing step for matching or collecting the list of matched bugs, levels, and severities to create an intermediate output report that includes the patches. Preferably, the output is sorted by the severity of the matched bug. More specifically, at 520, the phase builds a list of bugs for which a resolution is needed. At 522, for the next bug in the list, the bug history database 172 is scanned for matches and located patch information, if available, is extracted. The process is repeated at 524 until the entire bug list has been processed and at 526, the results are sorted by patch, type, and severity. If no patch is available, workaround information may be extracted from traditional repository of service-related information 195 by the service guru tool 150.

Significantly, the phased analysis in one embodiment is adapted to process the input information and the resulting matches and output by type and severity. In this regard, the type refers to a proactive basis, a reactive basis, or simply for information. Proactive means that the necessary preconditions exist for the problem or issue to occur on the system 110, reactive means that the problem or issue has occurred in the system 110, and for information means that the information (e.g., infodoc) applies to this configuration. Severity levels can also be associated with the output by each or most phases to identify the importance or need for quickly addressing the problem or issue. For example, the severity may range from customer data corrupted to a slight impaired functionality of the system 110. A fuller range of severities might include from most to least severe: data error, system hang, system panic, device hang, application hang, application crash, error warning message, system maintenance issue, administration issue, informational message, impaired functionality, and error in phased analysis itself.

The phased or stepped analysis continues at 474 with a check or review of the kernel configuration based on the input information from the computer system 110. Regular phased analysis is completed with performance of third party checks 478 of the input information from the computer system 110.

Figure 3H:
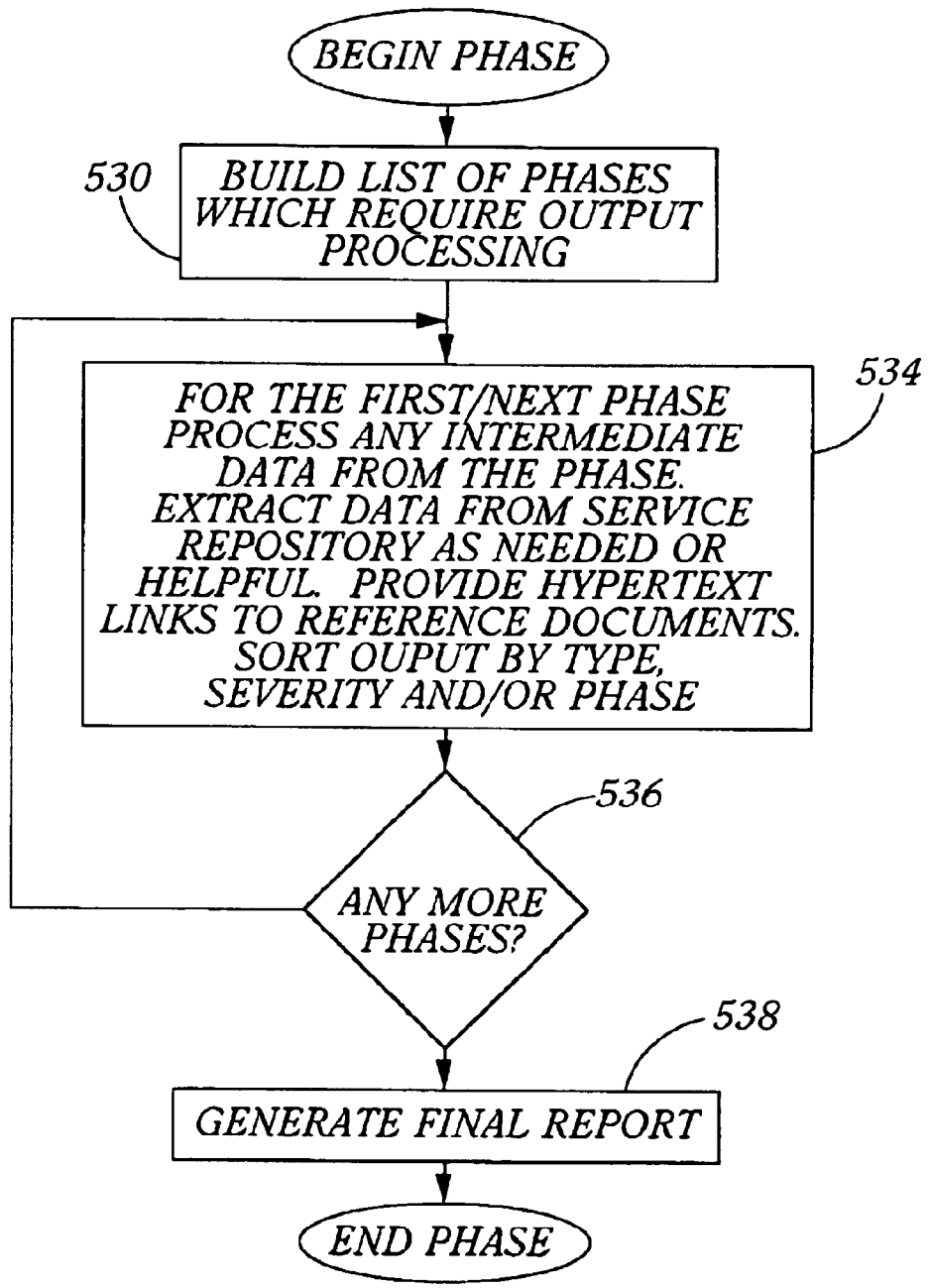

After the regular phased analysis is completed, the problem analysis by the tool 150 continues at 480 with the report generation phase, as detailed in FIG. 3H. Numerous formats for the report may be utilized including a display on the user interface or GUI 144, an e-mail message or e-mail message attachment to a service department connected to the communications network 120, or a printing of a hardcopy of the combined intermediate reports from each phase. As shown in FIG. 3H, the report generation phase may include at 530 building a list of phases which had output and need output processing. Then at 534, the intermediate output or data from each phase is processed and data is extracted from the service repository 195 as needed to complete the report or as useful or applicable for supplementing the phase output. Hypertext links can be provided to referenced documents within or outside the system 100. Preferably, the output is sorted at 534 by type, severity, and/or phase. Once no more phases are left at 536, the final report is generated at 538.

In a preferred embodiment, the report combines and arranges the intermediate reports from each phase and displays the report using text format with embedded URLs on the user interface 144. For example, the results may be ordered by the order the checks and phases were completed or by the severity of the problems or bugs identified. The output report preferably is viewable with standard interface applications such as Netscape™, dtmail, and the like. Each report preferably includes a recommended action or service guru comment, a type (i.e., proactive, reactive, or informational), and a severity. Additionally, the output report preferably is configured such that the report information is searchable because of the large number of problems/issues that may match for a given system 110.

According to yet another feature of the invention, the tool 150 is operated via the user interface 144 to compare one report output with a second report output to determine if changes have occurred. This is useful for determining the effectiveness of an implemented corrective action and also for performing planning (e.g., by running the tool 150 with various system configurations and then comparing the output reports created by the tool 150).

During operation, the service guru tool 150 typically responds to being invoked by creating a working directory 148 for temporary data and reports (at the node 130 or in a separate device and/or location). This action facilitates passing information between the precondition checks and between the phases using intermediate files. The output report from the problem analysis 300 preferably is placed in memory in an output directory in memory 160 or elsewhere and may later be examined to access the logs of all run phases for debugging and other purposes.

An important feature of the service guru system 100 is that the adopted programming language(s) is selected to allow accurate description of a wide range of problems or bugs. For example, in a preferred embodiment, each problem is described by a single script interpreted by the service guru tool 150.

Exemplary languages that may be used to create the service guru tool 150 include Perl, nawk, csh, ksh, sh and TCL and kvl, FM, simple, and mdb which are specific to Sun Microsystems, Inc. systems. The selected language preferably has the following features: pattern matching capability, stack parsing (e.g., ability to extract registers and bind to variables), ability to easily reference operating system, patch and other information that may be useful to screen problems, regular expression matching for message buffer and panic strings, and operating system independence. Additionally, it is preferable that the selected language be able to parse a variety of data sources in a version and environment independent way.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the descriptive information and/or strings collected from the underlying programs and core files may be varied and preferably are adapted to provide accurate and consistent matching and ranking of severity.

I claim:

1. A method for troubleshooting a computer system, comprising:

receiving, at a location remote to the computer system, a request for problem analysis for the computer system in response to an occurrence of a problem;

receiving data corresponding to the computer system comprising a core file from the computer system and supplemental configuration information;

accessing a knowledge store storing phases, wherein each phase includes a set of scripts adapted to identify previously identified computer problems;

performing a phased analysis of the computer system data comprising completing at least two of the phases from the knowledge store; and generating an output report including a list of the computer problems identified during the performing;

wherein each of the phases includes an optimization mechanism operable such that the phases executed in the performing is less than the set of the phases, wherein the optimization mechanism functions to check a list of static preconditions and to compare the static preconditions to the received computer system data; and wherein the static preconditions include variables selected from the group consisting of operating system identifications, operating system releases, software packages, software packages releases, system architectures, platforms, catch levels, and panic strings.

2. The method of claim 1, wherein the core file comprises a memory image created by the computer system in response to a kernel error, a hardware error, an application error, or other computer system error.

3. The method of claim 1, wherein the data receiving includes communicating with the computer system from the remote location over a communications network.

4. The method of claim 1, wherein the phased analysis performing includes parsing the computer system data into a source independent format and wherein the parsed computer system data is used as input for subsequent ones of the analysis phases.

5. The method of claim 1, wherein the phased analysis performing comprises a sequential analysis using the analysis phases to process a memory image from the computer system to create at least one corrective action for inclusion in the output report.

6. The method of claim 5, wherein the analysis phases are selected from the group consisting of a hardware error scan, a bug analysis, a user core file analysis, a kernel core file analysis, a parse of the computer system data into context free format, a check for bad patches, a check for software configuration and version, a check for hardware configuration and version, a software error scan, an infodoc check, a faq check, an srdb check, an stb/white paper check, retrieval of down revision patches, a security issue check, a system health check, a storage-related check, a platform analysis, a performance analysis, a kernel configuration check, and third party checks.

7. The method of claim 5, wherein the analysis phases each generate an intermediate output report for use by later performed ones of the analysis phases and for inclusion in the output report.

8. A method for reactively troubleshooting and proactively controlling problems on a computer system, comprising:

collecting data corresponding to the computer system;

accessing a knowledge store of previously identified computer system problems;

parsing the collected data into a context-free, language-independent format;

building a list of analysis phases to run on the collected data;

running each phase in the list using the collected data; and generating an analysis report based on output data from at least some of the analysis phases run;

wherein each phase comprises a plurality of scripts and wherein the running of each phase includes first performing a static precondition check for the phase to determine if a subset of the scripts applies to the computer system to improve run times by reducing the scripts executed during running.

9. The method of claim 8, wherein the scripts comprise testing the collected data for an instance of a problem, issuing a reactive output when the instance is found in the testing, and issuing a proactive output when the instance is not found and the problem is determined to possibly occur within the computer system.

10. The method of claim 9, wherein the reactive output and the proactive output includes supplemental data for each of the problems comprising type, severity, comment, and derived information.

11. The method of claim 10, wherein a type is proactive, reactive, or not applicable.

12. The method of claim 10, wherein a severity ranges from most to least severe and is selected from the group consisting of data error, system hang, system panic, device hang, application hang, application crash, error warning message, system maintenance issue, administration issue, informational message, and impaired functionality.

13. The method of claim 10, wherein a comment is sequential text selected to be useful in interpreting the problems.

14. The method of claim 10, wherein a derived information includes information extracted from a service repository.

15. A method for troubleshooting a computer system, comprising:

receiving, at a location remote to the computer system, a request for problem analysis for the computer system in response to an occurrence of a problem;

receiving data corresponding to the computer system comprising a core file from the computer system and supplemental configuration information;

accessing a knowledge store storing phases, wherein each phase includes a set of scripts adapted to identify previously identified computer problems;

performing a phased analysis of the computer system data comprising completing at least two of the phases from the knowledge store; and generating an output report including a list of the computer problems identified during the performing;

wherein the phased analysis performing comprises a sequential analysis using the analysis phases to process a memory image from the computer system to create at least one corrective action for inclusion in the output report; and wherein the analysis phases are selected from the group consisting of a hardware error scan, a bug analysis, a user core file analysis, a kernel core file analysis, a parse of the computer system data into context free format, a check for bad patches, a check for software configuration and version, a check for hardware configuration and version, a software error scan, an infodoc check, a faq check, an srdb check, an stb/white paper check, retrieval of down revision patches, a security issue check, a system health check, a storage-related check, a platform analysis, a performance-analysis, a kernel configuration check, and third party checks.

16. An apparatus for troubleshooting a computer system, comprising:

means for receiving a request for problem analysis for the computer system in response to an occurrence of a problem;

means for receiving data corresponding to the computer system comprising a core file from the computer system and supplemental configuration information;

means for accessing a knowledge store storing phases, wherein each phase includes a set of scripts adapted to identify previously identified computer problems; and means for performing a phased analysis of the computer system data comprising completing at least two of the phases from the knowledge store;

wherein each of the phases includes an optimization mechanism operable such that the phases executed in the performing is less than the set of the phases, wherein the optimization mechanism functions to check a list of static preconditions and to compare the static preconditions to the received computer system data; and wherein the static preconditions include variables selected from the group consisting of operating system identifications, operating system releases, software packages, software packages releases, system architectures, platforms, patch levels, and panic strings.

17. A method for reactively troubleshooting and proactively controlling problems on a computer system, comprising:

receiving data corresponding to the computer system;

receiving previously identified computer system problems;

building a list of analysis phases to run on the collected data; and running each phase in the list using the collected data;

wherein each phase comprises a plurality of scripts and wherein the running of each phase includes first performing a static precondition check for the phase to determine if a subset of the scripts applies to the computer system to improve run times by reducing the scripts executed during running.

18. The method of claim 17, wherein the scripts comprise testing the collected data for an instance of a problem, issuing a reactive output when the instance is found in the testing, and issuing a proactive output when the instance is not found and the problem is determined to possibly occur within the computer system.

19. An apparatus for reactively troubleshooting and proactively controlling problems on a computer system, comprising:

means for receiving data corresponding to the computer system;

means for receiving previously identified computer system problems;

means for building a list of analysis phases to run on the collected data; and means for running each phase in the list using the collected data;

wherein each phase comprises a plurality of scripts and wherein the running of each phase includes first performing a static precondition check for the phase to determine if a subset of the scripts applies to the computer system to improve run times by reducing the scripts executed during running.

* * * * *

UNITED STATES PATENT AND TRADEMARK OFFICE
CERTIFICATE OF CORRECTION

PATENT NO. : 6,859,893 B2
DATED : February 22, 2005
INVENTOR(S) : George Hines

It is certified that error appears in the above-identified patent and that said Letters Patent is hereby corrected as shown below:

Column 16,
Line 33, "catch" should be -- patch --

Signed and Sealed this

Twenty-fourth Day of May, 2005

JON W. DUDAS
*Director of the United States Patent and Trademark Office*